United States Patent [19]

Alicot et al.

[11] Patent Number: 4,657,751

[45] Date of Patent: Apr. 14, 1987

[54] PROCESS FOR PURIFYING AQUEOUS HYDRAZINE HYDRATE SOLUTIONS

[75] Inventors: Michel Alicot; Jacky Pierre, both of La Barte De Neste, France

[73] Assignee: ATOCHEM, France

[21] Appl. No.: 699,043

[22] Filed: Feb. 7, 1985

[30] Foreign Application Priority Data

Feb. 14, 1984 [FR] France .................... 84 02194

[51] Int. Cl.$^4$ ............................................. C01B 21/16
[52] U.S. Cl. ......................... 423/407; 210/691; 210/692; 210/694
[58] Field of Search .............. 423/407; 210/691, 692, 210/694

[56] References Cited

U.S. PATENT DOCUMENTS

| | | | |
|---|---|---|---|
| 2,537,791 | 1/1951 | Schwarez | 423/407 |
| 2,620,926 | 12/1952 | Helbig | 210/694 |
| 2,955,921 | 10/1960 | Henrich | 423/407 |
| 3,189,411 | 6/1965 | Kohnen et al. | 423/407 |
| 3,436,344 | 4/1969 | Canning et al. | 210/694 |
| 3,454,361 | 7/1969 | Huber et al. | 423/407 |
| 3,458,283 | 7/1969 | Meissner | 423/408 |
| 3,469,940 | 9/1969 | Needham et al. | 423/407 |
| 3,520,806 | 7/1970 | Haigh | 210/692 |
| 3,598,546 | 8/1971 | Good et al. | 423/407 |
| 3,625,886 | 12/1971 | Mattia | 210/691 |
| 3,652,218 | 3/1972 | Rigsby | 423/407 |
| 3,740,436 | 6/1973 | Rigsby | 423/407 |
| 3,976,756 | 8/1977 | Wojtowicz | 423/407 |
| 4,040,990 | 8/1977 | Neely | 521/29 |

FOREIGN PATENT DOCUMENTS

| | | | |
|---|---|---|---|
| 1060065 | 2/1964 | United Kingdom | 423/407 |
| 1017663 | 1/1966 | United Kingdom | 423/407 |
| 1122034 | 7/1968 | United Kingdom | 423/407 |
| 1133762 | 11/1968 | United Kingdom | 423/407 |
| 1146291 | 3/1969 | United Kingdom | . |
| 1273911 | 5/1972 | United Kingdom | . |

*Primary Examiner*—John Doll
*Assistant Examiner*—Helane Myers
*Attorney, Agent, or Firm*—Sigalos & Levine

[57] ABSTRACT

The invention concerns the purification of impure aqueous hydrazine hydrate solutions by treating the hydrazine hydrate solution by means of a solid absorbent material consisting of microporous particles whose mean granulometry is smaller than 5 mm.

7 Claims, No Drawings

PROCESS FOR PURIFYING AQUEOUS HYDRAZINE HYDRATE SOLUTIONS

BACKGROUND OF THE INVENTION

Hydrazine hydrate is obtained by the oxidation of ammonia in the presence of carbonyl compounds by a number of different processes. These processes, which differ in particular by the nature of the oxidizing agent and by the nature of the carbonyl compounds used, make it possible to obtain the hydrazine in the form of stable organic combinations in the reaction medium. By way of illustrating these processes, there are noted especially those described in French Pat. Nos. 2,092,734 and 2,324,618; German Pat. Nos. 1,088,939, 1,103,902, and 1,123,330; British Pat. Nos. 1,122,034 and 1,133,762; U.S. Pat. No. 3,976,756, and Japanese Pat. No. 706532. In a general manner, the hydrazine hydrate is obtained from these combinations by acid hydrolysis or by the sole action of water under determined conditions of temperature and pressure as described, for instance, in French Pat. Nos. 2,323,634 and 2,323,635 or German Pat. Nos. 1,066,558 or 1,130,797. The hydrazine hydrate is obtained in the form of an aqueous solution of a concentration between 1 and 100%; more generally between 5 and 35%.

The nature of the oxidation reactions used cause these processes to generate at the same time as generating the stable organic combination of hydrazine, by-products of various natures, composed of carbon and hydrogen atoms with which oxygen and/or nitrogen atoms can also be associated. They are formed either during the oxidation reaction or during the hydrolysis reaction. Thus, for instance, these dissolved products can be the principal constituents of the oxidation solution; azine, hydrazone, diazacyclopropane, and the like, but also the alkaline condensation products of the carbonyl derivative: ketoalcohols, unsaturated ketones, dihydropyridines, tetrahydropyrimidines, piperidones, and the like, or yet reaction products of the preceding compounds with hydrazine; namely, pyrazolines and the like; and finally products having simultaneously been subjected to several of the preceding chemical transformations. More precisely and without limitation, these are either hydrocarbons or compounds comprising ketone, alcohol, epoxide, amine, amide, oxime, hydrazone, hydrazine, or azine functional groups with the compounds capable of presenting a heterocyclic structure of the pyrazoline, pyrazole, aziridine, pyrazine, pyridazine, triazole, imidazole, pyrrole, or pyridine type, and the like.

These by-products can be encountered again in the hydrazine hydrate solution and in order to purify it, it is necessary to resort to suitable chemical engineering operations such as distillation or liquid-liquid extraction. In this manner, one arrives effectively at lowering the ratio of these by-products down to a value below 1%, and more generally between 0.1% and 0.3%, values below which one cannot descend economically by such means, because of the complexity of the equilibria set in action during these purification operations.

The presence of these impurities can, in a certain number of applications, reveal themselves as undesirable. Amongst others, there is cited the uses of hydrazine hydrate as raw material in the fabrication of medicinal substances or as composing the propellants of special engine motors (airplanes or satellites, for instance).

It is known in the prior art to proceed with the purification of aqueous hydrazine solutions by treatment on ion exchange resins (U.S. Pat. Nos. 3,458,283, 3,652,218, and 3,740,436; and Japanese patent No. 72-45275). But these compounds concern only the elimination of ionic impurities, such as $Na^+$, $Cl^-$, and the like of aqueous hydrazine solutions.

SUMMARY OF THE INVENTION

The present invention thus concerns a process of purifying impure aqueous hydrazine hydrate solutions, with said process being characterized by the fact that the hydrazine hydrate in aqueous solution is treated with a solid absorbent material devoid of functional groups reactive with hydrazine, with said absorbent material consisting essentially of microporous particles of a mean granulometry smaller than 5 mm with the pore volume of said particles being between 10 and 70% and the mean diameter of the pores being below 500 Å.

DETAILED DESCRIPTION

The absorbent materials used preferably have a mean granulometry between 100μ and 3 mm, the pore volume preferably is between 20 and 60%, and the mean diameter of the pores advantageously is between 20 and 300 Å.

In the invention, preference is given to materials whose preceding characteristics are such that the specific surface is between 10 and 1500 m²/g and preferably from 100 to 1000 m²/g.

In the invention, the pore volume is measured by the mercury absorption method described by E. W. WASHBURN in PROC. OF NAT. OF ACAD. OF SCIENCE OF UNITED STATES Vol. 7, pp. 115-116 (1921) and ROOTARE H. M., PREZELOW C. F. in JOURN. OF PHYS. CHEM. Vol. 71, pp. 2733 (1967) and by the gas absorption-desorption isotherms according to the method of J. P. LeHAIR described in the Bulletin de la Societe Francaise de Ceramique 1971, p. 39.

The mean diameter of the pores is measured from the preceding measurements.

The specific surface is measured by the standard B.E.T. method.

The absorbent materials utilizable in conformity with this invention are selected from among numerous families of products responding to the previously mentioned physical and chemical characteristics. They are more particularly selected from among the group constituted of purely carbonaceous materials, coming particularly from the pyrolysis of synthetic hydrocarbon compounds or hydrocarbon compounds of natural origin, and from among the polymers not having functional groups reactive with hydrazine in their molecules. Among these polymers are those comprising only carbon and hydrogen atoms in their molecules.

By way of illustration of the synthetic hydrocarbon compounds or hydrocarbon compounds of natural origin leading by pyrolysis to the purely carbonaceous compounds previously mentioned, there are especially acetylene, methane, napthalene, coconut and various woods such as beech.

By way of illustration of suitable hydrocarbon polymers, there are especially styrene, substituted styrenes such as p-methylstyrene, ethylstyrene, homopolymers and copolymers thereof and/or with divinylbenzene trivinylbenzene, alkyldivinylbenzenes, or alkyltrivinylbenzenes, at the rate of 1 to 3 or 4 alkyl substituents having from 1 to carbon atoms on the benzene ring.

The treatment of the aqueous hydrazine solutions in conformity with the process according to the invention can be carried out in a variety of different ways. One can more particularly use any one of the following techniques:

(i) Effecting a percolation of the hydrazine hydrate solution to be purified on a bed of absorbent material which is advantageously in a physical form so that an optimum contact is ensured between the absorbent sites and the solution and a pressure drop compatible with a percolation velocity permitting a sufficient productivity; or (ii) Displacing the absorbent material vertically, according to a continuous or discontinuous procedure from top to bottom (gravity column) or from bottom to top (forced column) by following the techniques described by LEMIRGEAUX and ROQUES in Chimie et Industrie, Genie Chimique, Vol. 105, No. 12—May 1972.

It goes without saying that the ratio of the volume of the absorbent material to the volume of the hydrazine hydrate solution and the duration of the treatment are a function of numerous parameters, and in particular of the initial content and the desired final content of impurities, of the type of impurities, of the nature and the physical characteristics of the absorbent material, of the selection of the treatment technique, such as mentioned above, and of the flow rate of the solution to be treated. In a purely indicative manner, it is pointed out that for hydrazine hydrate solutions containing in the order of 2000 ppm of usual impurities (ketone, alcohol, azine, and the like, expressed in weight of carbon) one can easily lower this content to 2-300 ppm, and indeed to 50-100 ppm, with a volume of absorbent material representing from 1/50 to ¼ of the volume of solution to be treated without having to regenerate said absorbent substance. It is clear that the indications of the foregoing parameters as to volume of absorbent material used give an order of magnitude, but that one would not depart from the scope of the invention by deviating from these indications. In fact, by utilizing the absorbent materials of the present invention, one skilled in this art can readily determine by routine experimentation the optimum parameters for purifying any particular impure aqueous solution of hydrazine hydrate.

When the absorbent materials are saturated in impurities, they can be regenerated by washing with water, with alkaline or acid aqueous solutions or, preferably, with a solvent. The solvents usable for the regeneration are selected, in non-limiting manner, from among alcohols, ketones, or aliphatic or aromatic hydrocarbons. By way of non-limiting examples, there can be used methyl alcohol, ethyl alcohol, acetone, methylethylketone, benzene, xylene, hexane, or cyclohexane. These solvents can be recycled after having been purified, for instance by distillation.

The invention will be further described in connection with the following examples which are set forth for purposes of illustration only.

EXAMPLE 1

Into a column having a diameter of 2 cm and a height of 30 cm one places, supported by a fritted glass disk, 50 cm$^3$ of styrene-divinylbenzene copolymer previously placed in suspension in a water/alcohol solution (water-methyl alcohol) and washed with water. This copolymer is in the form of spheres whose mean pore diameter is 50 Å, the specific surface is 750 m$^2$/g and the pore volume is 51%.

At a flow rate of 100 cm$^3$/h, through the upper part of the column, a 100% solution of hydrazine hydrate ($N_2H_4.H_2O$) is introduced having a total carbon content of 900 ppm, obtained in an oxidation process of ammonia by hydrogen peroxide in the presence of methylethylketone. The impurities essentially consist of products having functional groups of azine, hydrazone, amide, and oxime. After the column is placed in equilibrium, in 5½ hours of percolation, one obtains 550 cm$^3$ of hydrazine hydrate of the same concentration, but whose total carbon content is 350 ppm.

The total carbon content is measured by oxidation in an oxygen current at 950° C. and on catalyst (cobalt oxide) of the carbonaceous materials converted into $CO_2$ and then determined by infrared spectrography.

EXAMPLE 2

Into an apparatus identical to the one of Example 1, containing 50 cm$^3$ of absorbent material, described in Example 1, at a flow rate of 100 cm$^3$/h one introduces a solution of hydrazine hydrate of a 25% titer whose total carbon content is 1440 ppm. In 1 hour of percolation, one obtains 100 cm$^3$ of hydrazine hydrate solution of equivalent titer, but whose total carbon content is between 50 and 100 ppm. After 5 hours of percolation, one has obtained 500 cm$^3$ of hydrazine hydrate solution of the same titer, the total carbon content being 200 ppm.

EXAMPLE 3

A hydrazine hydrate solution is introduced into an apparatus identical to the one of Example 1, containing 50 grams of carbon black, previously deoxygenated, in the form of small extruded rods 1 mm in diameter and 3 mm in width, at a flow rate of 100 cm$^3$/h, the hydrazine hydrate solution is of a titer of 26% and has a total carbon content of 1440 ppm. In 3 hours of percolation, 300 cm$^3$ of hydrazine hydrate solution are obtained, but whose total carbon content is 250 ppm. The pore volume of carbon black is about 50%: 35% of the pores have a diameter below 10 Å.

EXAMPLE 4

Into an apparatus identical to the one of Example 1, containing 50 cm$^3$ of absorbent material described in Example 1, at a flow rate of 100 cm$^3$/h one introduces a hydrazine hydrate solution of a titer of 10% and whose total carbon content is 2400 ppm. In 2½ hours of percolation, one obtains 250 cm$^3$ of hydrazine hydrate solution whose total carbon content is 600 ppm.

EXAMPLE 5

Into the apparatus of Example 1 one places, supported by a fritted glass disk, 50 cm$^3$ of polystyrene resin cross-linked to divinylbenzene. This product, in the form of white balls whose mean pore diameter is 75 Å, has a specific surface of 600 m$^2$/g of dry product, the granulometry being between 0.3 and 1.2 mm.

At a flow rate of 100 cm$^3$/h, through the upper part of the column hydrazine hydrate is introduced titrating 10% and containing 2400 ppm of total carbon. In 2½ hours of percolation, one obtains 250 cm$^3$ of hydrazine hydrate solution whose total carbon content is 1000 ppm.

EXAMPLE 6

Into an apparatus identical to the one of Example 1 and containing 50 cm³ of absorbent material described in Example 1, at a flow rate of 100 cm³/h one introduces a hydrazine hydrate solution having a titer of 26% and whose total carbon content is 1440 ppm. In 4 hours of percolation, it is noticed that the total carbon content of the percolated hydrazine hydrate solution, after having fallen to 180 ppm, gradually rises to 600 ppm, indicating the beginning of saturation of the copolymer. In 2 hours of supplementary percolation, the total carbon content reaches 650 ppm. The copolymer is considered to be saturated. The resin is washed with 200 cm³ of water in order to recover the hydrazine hydrate, then with 150 cm³ of methyl alcohol, then with 400 cm³ of water. The copolymer is again ready to be used in a new hydrazine hydrate purification operation.

An identical result is obtained when in place of methyl alcohol, 150 cm³ of methylethylketone are used.

EXAMPLE 7

Into a column having a diameter of 3.8 cm and a height of 2 m, 800 cm³ of absorbent resin of Example 1 are placed according to the process described in Example 1. From hydrazine hydrate titrating 99% and containing 2400 ppm of total carbon, at a flow rate of 400 cm³/h one obtains 25 kg of hydrazine hydrate solution of the same titer whose total carbon content is 350 ppm.

EXAMPLE 8

Operation takes place as in Example 7, but the extraction column is supplied with hydrazine hydrate at a flow rate of 3000 cm³/h. 25 kg of hydrazine hydrate are obtained, whose total carbon content is 350 ppm. This example shows that the efficiency of the extraction is not affected by a variation in the flow rate of delivery.

EXAMPLE 9

In an apparatus identical to the one of Example 1, containing 50 g of absorbent material of Example 1, one treats an aqueous hydrazine hydrate solution titrating 55% and containing 1000 ppm of total carbon, obtained according to an oxidation process of ammonia with a halognated mineral compound in the presence of a ketone. At a flow rate of 100 cm³/h, one obtains 1500 cm³ of hydrazine hydrate solution of identical titer whose total carbon content has been lowered to 300 ppm.

EXAMPLE 10

In identical manner to the one described in Example 9, from an aqueous hydrazine hydrate solution obtained by the same process as above, titrating 96% and containing 1000 ppm of total carbon, one obtains 1500 cm³ fo aqueous hydrazine hydrate solution of the same titer and containing 300 ppm of total carbon.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. The process of purifying an impure aqueous hydrazine hydrate solution comprising treating said solution with a solid absorbent material devoid of functional groups reactive with hydrazine and having a mean granulometry smaller than 5 mm. with the pore volume of said particles being between 10 and 70% and the mean diameter of the pores being below 500 Å; said absorbent material consisting essentially of microporous particles of a carbonaceous compound resulting from the pyrolysis of a synthetic or naturally occurring hydrocarbon compound or a polymer devoid of functional groups reactive with hydrazine having a mean granulometry smaller than 5 mm.

2. The process of claim 1, wherein the specific surface of the particles of absorbent material is between 10 and 1500 m²/g.

3. The process of claim 2, wherein the mean granulometry of the absorbent materials is between 100μ and 3 mm and the specific surface of the particles of absorbent material is between 100 and 1000 m²/g.

4. The process of claim 3, wherein the pore volume is between 20 and 60% and the mean diameter of the pores is between 20 and 300 Å.

5. The process of claim 4, wherein the hydrocarbon compound is selected from acetylene, methane, naphthalene, coconut, and wood.

6. The process of claim 1, 2, 3, or 4, wherein said polymer is selected from styrene, p-methylstyrene, ethylstyrene, or homopolymers or copolymers thereof and/or with divinylbenzene, trivinylbenzene, alkyldivinylbenzenes, and alkyltrivinylbenzenes, at a rate of 1 to 4 alkyl substituents having from 1 to 2 carbon atoms on the benzene ring.

7. The process of claims 1, 2, 3, 4, or 5, wherein treatment is effected by percolation of the hydrazine hydrate solution to be purified on a bed of said absorbent material.

* * * * *